Jan. 2, 1968 L. K. CHILDRESS 3,360,994

APPARATUS AND METHOD FOR DETERMINING SPECIFIC GRAVITY

Filed Aug. 19, 1965 3 Sheets-Sheet 1

INVENTOR
LESTER K. CHILDRESS

BY Ayates Dowell &
Ayates Dowell Jr.
ATTORNEYS

APPARATUS AND METHOD FOR DETERMINING SPECIFIC GRAVITY

Filed Aug. 19, 1965 3 Sheets-Sheet 2

INVENTOR
LESTER K. CHILDRESS

BY Hyatt Dowell &
Hyatt Dowell Jr.
ATTORNEYS

APPARATUS AND METHOD FOR DETERMINING SPECIFIC GRAVITY

Filed Aug. 19, 1965 3 Sheets-Sheet 3

INVENTOR
LESTER K. CHILDRESS

BY Ayates Dowell &
Ayates Dowell Jr.
ATTORNEYS

United States Patent Office 3,360,994

Patented Jan. 2, 1968

3,360,994

APPARATUS AND METHOD FOR DETERMINING SPECIFIC GRAVITY

Lester K. Childress, Richmond, Va., assignor to Solite Corporation, Richmond, Va.

Filed Aug. 19, 1965, Ser. No. 480,889

11 Claims. (Cl. 73—433)

ABSTRACT OF THE DISCLOSURE

A scale for determining specific gravity of solids includes a beam scale and counterweights (29) and (30) which bring the scale into balance as soon as a desired sample weight of material is placed in a container (41) on the scale. After the container with the sample therein is filled to a precise volume with water, major weights (34) and minor weights (35) are moved to indicia properly located on the beam to indicate the specific gravity of the sample.

Figure 1:
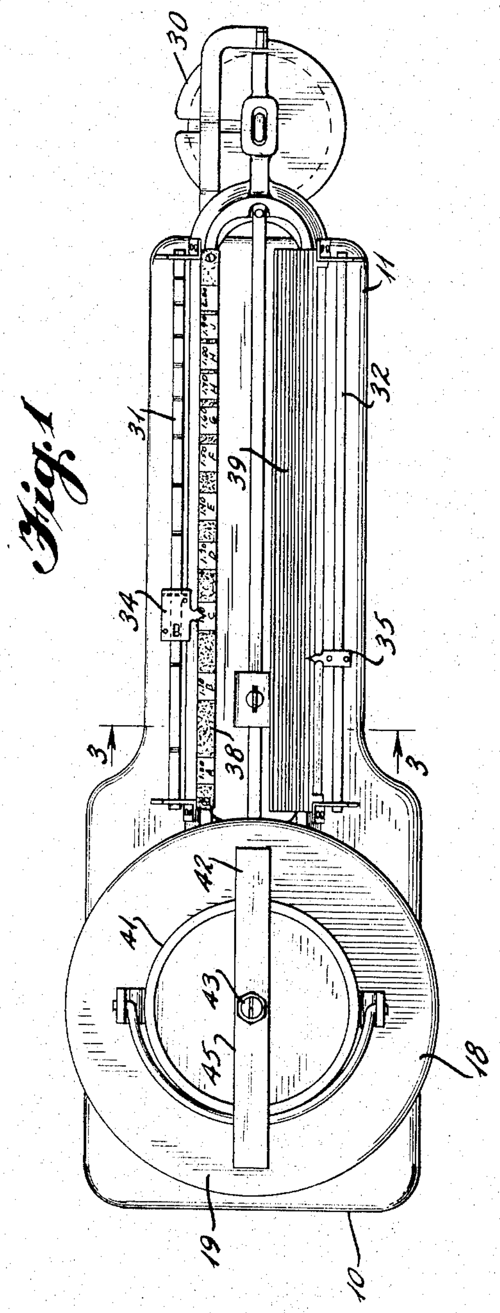

A process for calibrating the scale includes the steps of placing a plurality of selected weights on the container side of the balance equal to the total weight of the container, the sample, and the amount of water needed to fill the container to the precise volume with a sample of a known specific gravity and marking indicia for the particular specific gravity at the point on the beam where the movable weights (34) and (35) balance this load, with the counterweights (29) and (30) on the counterpoise (28). The process is repeated to locate indicia marks for other specific gravities.

This invention relates to the art of measuring and testing substances of various kinds, to apparatus and methods employed in so doing, including the determination of the specific gravities of various substances.

The invention relates specifically to apparatus and method for rapidly and easily determining the specific gravity of solid materials, such as lightweight aggregates employed in the manufacture of masonry structures, and to the method of calibrating apparatus used in making such determinations.

Lightweight aggregates have been used in increasing quantities in view of the fact that substitution of the same for sand and gravel in a concrete or masonry mixture has resulted in less weight in a given volume. One way in which lightweight aggregate has been produced is by subjecting clay or other earthy substance to intense heat to cause expansion and, resultantly, a relatively low specific gravity ordinarily varying between 1.0 and 2.0, contrasted with the specific gravity of gravel which is ordinarily on the order of 2.60.

Determination of specific gravity has been found desirable or essential since the properties of the concrete may vary with different specific gravities. Also it has been found desirable from a design point of view that the resulting concrete be no heavier than can be properly supported and that the aggregate be uniform in weight throughout a particular structure to avoid structural weaknesses resulting from an unequal distribution of weight.

Prior devices and methods for measuring specific gravity have been subject to criticism because they were time-consuming and susceptible to error in use. Further, they were unsuited for substances of different textures and varying compositions.

It is well known that hydrometers are useful only to measure the specific gravity of highly viscous fluids. Other previously known specific gravity scales are limited to measurements of semi-solid materials such as ice-cream mixtures that can substantially fill containers of known volume. Measuring the specific gravity of solid materials of irregular shape is more complex since both the weight and volume of the materials must be measured resulting in several steps, including procedures such as weighing the material in and out of water. The problem additionally is complicated with a material of the nature of an aggregate which involves the weighing of solid particles.

The measurement of the specific gravity of aggregates heretofore has been determined as follows:

(1) A predetermined weight of the aggregate, for example, 500 grams, whose specific gravity is to be determined, is measured on a suitable weighing scale.

(2) This weight is then placed within a container of known weight, for example 500 grams, which, when filled completely, holds an exactly known volume of water, for example 1000 cc. which weighs 1000 grams.

(3) The container is then filled with water and is again weighed and for purposes of this example might be found to weigh 1,723 grams.

(4) The following calculations are then performed:

| | | Grams |
|---|---|---|
| Total weight: Container, aggregate sample, and water | | 1,723 |
| Subtract: | | |
| Container weight (empty), grams | 500 | |
| Aggregate sample weight, grams | 500 | |
| | 1,000 | 1,000 |
| Weight of water in container | | 723 |
| Weight of water needed to fill container if no aggregate sample present | | 1,000 |
| Subtract: Water in container | | 723 |
| Weight of water same volume as aggregate sample | | 267 |

Specific gravity=

$$\frac{\text{Weight of sample}}{\text{Wt. of same volume of water}}=\frac{500}{267}=1.87$$

The expense and time required for this procedure also limits the frequency at which the samples of the plant output can be weighed.

An object of the present invention is to provide a method and apparatus for measuring specific gravity with a minimum of labor and in a simple manner capable of being performed by unskilled workers who do not know how to perform complex calculations and at a saving in time and with a decrease in the likelihood of error.

Another object of the invention is to provide a simple procedure for calibrating a scale designed to indicate directly the specific gravity of a sample.

Figure 4:
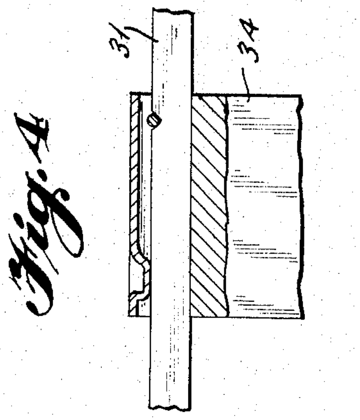
Figure 3:
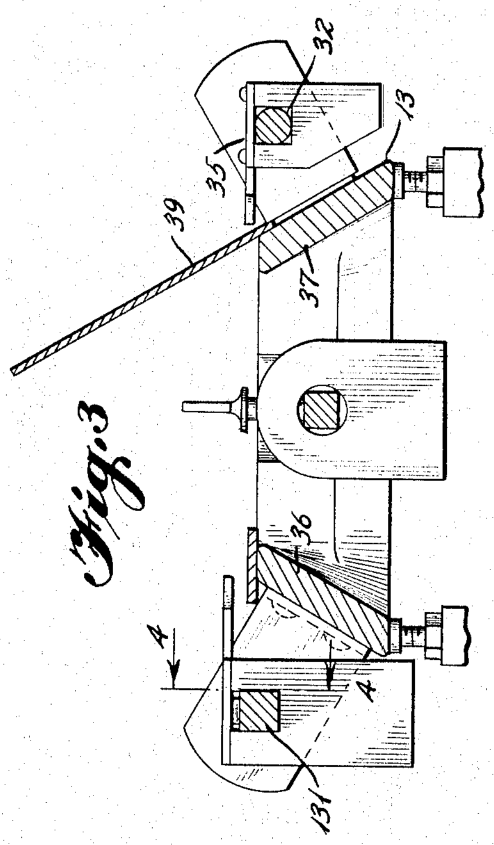
Figures 2, 5:
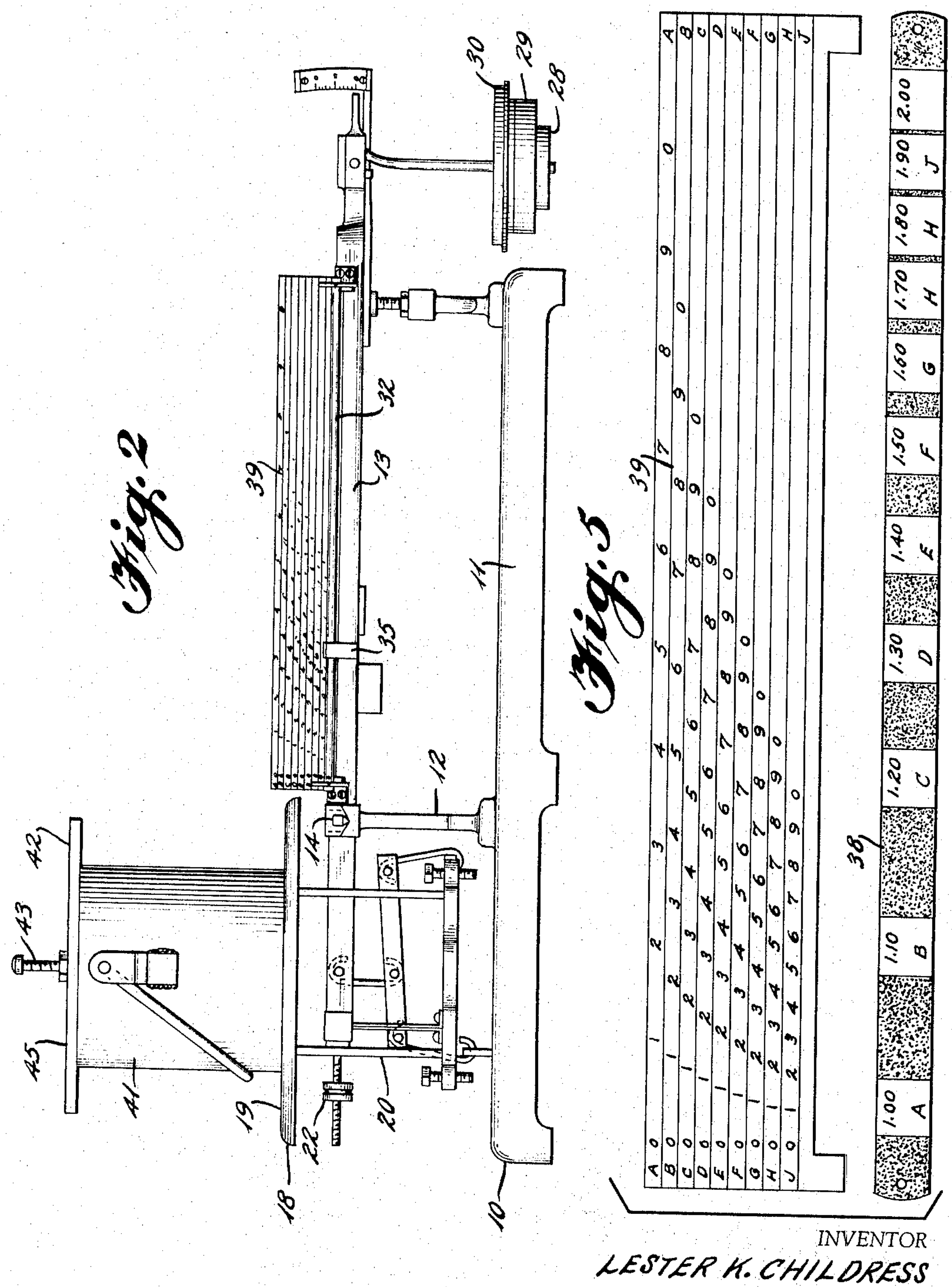
Figures 6, 7:
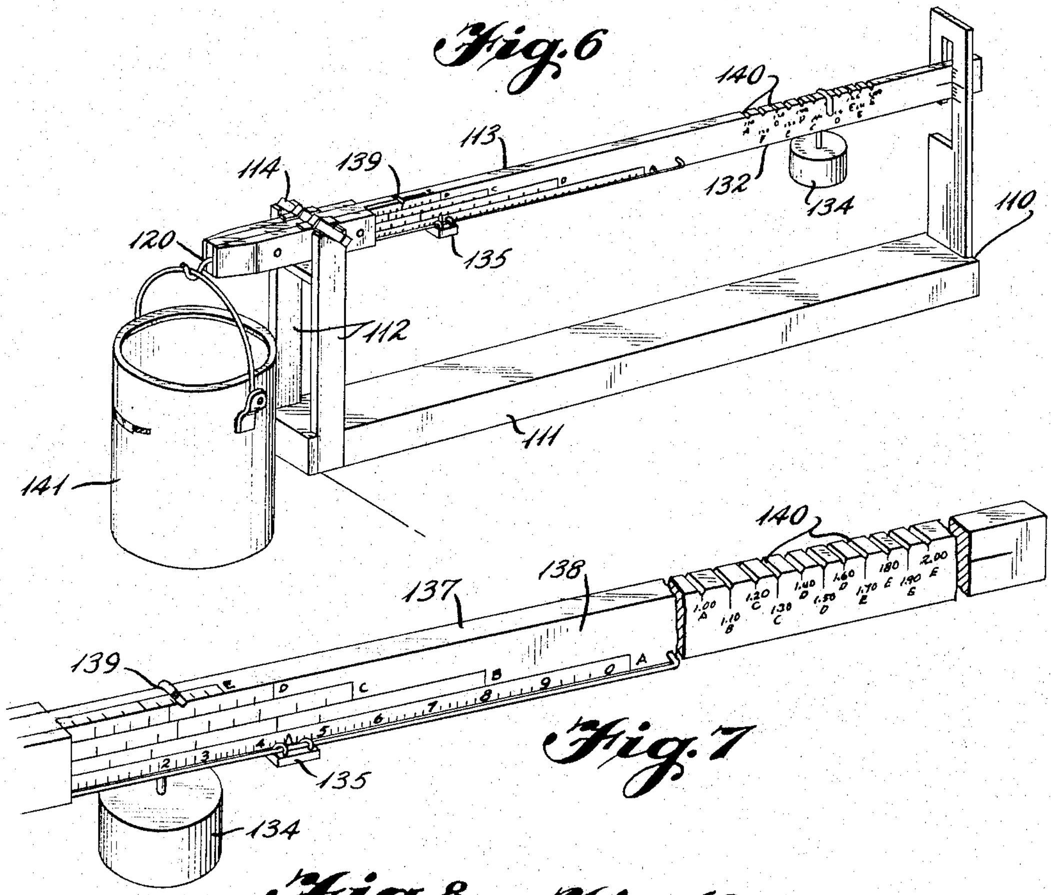
Figure 8:
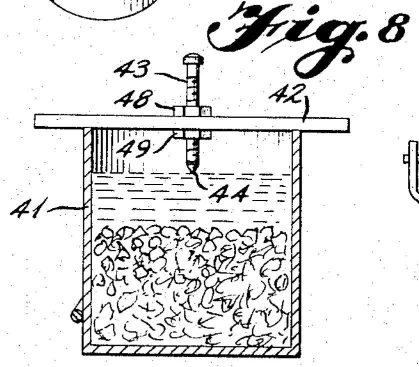
Figure 10:
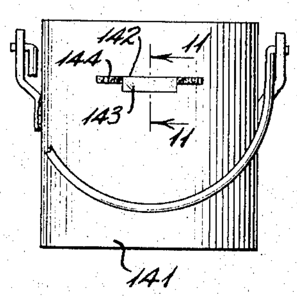
Figure 11:
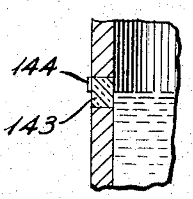
Figure 9:
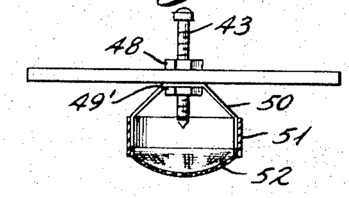

Other objects and advantages of the invention will be apparent from the following description taken in conjunction with the accompanying drawings in which:

FIG. 1 is a plan view of one embodiment of the invention;

FIG. 2, a side view of the apparatus of FIG. 1;

FIG. 3, a sectional view on the line 3—3 of FIG. 1;

FIG. 4, a fragmentary sectional view on the line 4—4 of FIG. 3;

FIG. 5, a detailed view of the indicator plates of the scales of the apparatus of FIG. 1;

FIG. 6, a perspective view illustrating another embodiment of the invention;

FIG. 7, a fragmentary perspective view of the scale beam of the apparatus of FIG. 6;

FIG. 8, a sectional view through the container shown in FIGS. 1 and 2 and illustrating the vertically adjustable visual height stop;

FIG. 9, a view of a modified form of the visual height stop of FIG. 8;

FIG. 10, a modified container which may be used in accordance with the present invention and incorporating a sight glass; and, FIG. 11, a sectional view on the line 11—11 of FIG. 10.

Briefly stated, in achieving these and other objects, a weighing scale is calibrated to give direct readings of specific gravity if the approprate procedure is followed. A container is placed on a weighing scale. 1,000 grams of aggregate is placed within the container. The container is then filled until it contains precisely 2,600 cc. of water plus aggregate. The total weight of the container's contents increases as the specific gravity of the sample increases, as shown by these two examples:

| | | |
|---|---|---|
| Specific Gravity | 1.0 | 2.0 |
| Sample Volume (1,000 gm.), cc | 1,000 | 500 |
| Water Volume, cc | 1,600 | 2,100 |
| Water Weight, gm | 1,600 | 2,100 |
| Sample Weight, gm | 1,000 | 1,000 |
| Total Weight, gm | 2,600 | 3,100 |

Numerals 1.0 and 2.0 are placed on the weighing scale at points that would normally indicate weights of 2600 gm. and 3100 gm. in the container respectively. The scale is marked with numerals corresponding to intermediate specific gravities between 1.0 and 2.0. These markings are made at points corresponding to the weight indicated when the container has samples of the given specific gravity therein plus water to make 2600 cc.

An additional feature of the invention makes the placing of the 1,000 grams of aggregate in the container extremely simple. A counterweight which precisely balances the container plus 1,000 grams is normally carried by a beam type scale constructed in accordance with this invention. Therefore, all that one has to do to weigh out 1,000 grams of aggregate is to place the container on the load platform of the scale and slowly pour in aggregate until the scale balances. There is then precisely 1,000 grams of aggregate in the container. The scale beam carries movable weights which are manipulated to again balance the scale after adding water to the predetermined level and the specific gravity of the sample is read from numerals above the balance weight positions.

In embodiments of the invention which do not utilize a counter weight the procedure is also easy. Such weighing scales normally have a movable indicator. A mark is placed on the scale at the position of the indicator for the weight of the container plus 1,000 grams. A container is placed on the weighing scale. The container is then filled to the 2,600 cc. level with water and specific gravity is read from markings placed at appropriate locations on the scale.

Referring to the drawings, a beam scale 10 includes a base 11, a scale beam fulcrum post 12, and a scale beam 13 supported on the fulcrum post by a knife edge 14 fixed to the scale beam. A load receiving platform 18 is operatively connected to the scale beam 13 through a linkage 20 which permits vertical movement of platform 18 while its top surface 19 is maintained in a horizontal position. A counterpoise 28 is secured to the opposite end of scale beam 13 and carries counterweights 29 and 30. A pair of balance weight holding rods 31 and 32 are secured at each end to scale beam 13 so that their central portions are parallel to and spaced from the scale beam arm 13. A major balance weight 34 and a minor balance weight 35 are slidably mounted on rods 31 and 32, respectively. Beam 13 carries a threaded adjustment screw 22 for fine balance adjustment during calibration.

Frame 11 includes horizontal upper members 36 and 37 which normally carry indicator plates on which numerals indicate the various weights corresponding to the movable balance weight positions. In applicant's device, these are replaced by a major indicator plate 38 and a minor indicator plate 39, carrying numerals corresponding to specific gravity.

A container 41 is used with this scale. This container is made of aluminum which permits a rugged construction with a minimum of weight. The rugged construction minimizes the danger of dents or other distortions which would vary the volume contained therein. The interior of the container is carefully machined for similar precise volume control. Resting on top of container 41 is a visual height stop assembly 45. It includes a bar 42 having a threaded visual height stop 43 mounted therein. The lower end of stop 43 is beveled as at 44. Nuts 48 and 49 hold stop 43 in a selected vertical position.

In FIG. 9 an additional structure that may be used with the visual height stop assembly 45 is illustrated. A yoke 50 is supported by nut 49' and has secured to its lower end a ring 51. A metallic screen 52 is secured to the bottom of ring 51. This structure prevents floating debris from engaging the tip 44 of visual height stop 43.

In FIGS. 10 and 11 an alternative container 141 is illustrated which has an aperture 142 in one of its cylindrical walls, with a transparent glass 143 closing this aperture. Any suitable indicia, as for example, tape 144, may be mounted at each side of aperture 142 to indicate the level to which fluid should be filled in order to place a designated volume within container 141.

*Alternative scale embodiment*

FIGS. 6 and 7 illustrate an alternative embodiment of a scale 110 according to the invention, including a base 111 on which is mounted a pair of fulcrum posts 112. A scale beam 113 has fixed thereto a knife-edged pivot member 114 which rests on fulcrum posts 112. A major balance weight 134 is mounted for sliding movement along scale beam 113 and can be received within grooves 139 or 140. A minor weight slide 132 is fixed to, parallel to, and spaced from scale beam 113 and has a minor balance weight 135 slidably mounted thereon. A hook 120 fixed to the end of scale beam 113 on the side of knife-edged pivot member 114 opposite the balance weight carries a container 141.

*Manufacturing calibrations*

Since it is desired to permit the operator to determine specific gravity of a sample without mathematical computation, the scale is calibrated in specific gravity units rather than weight units. For each position of the movable balance weights, specific gravity must be determined and numerals corresponding to specific gravity marked on major indicator plate 38 and minor indicator plate 39 so that particular positions of movable balance weights 34 and 35 indicate particular specific gravities.

Applicant uses a 1,000 gram sample of aggregate, and sufficient water to make 2,600 cc. of aggregate, plus water.

Before calibrating the scale to read in terms of specific gravity for particular movable weight positions, a step is taken to facilitate the weighing of 1,000 grams of aggregate during operational use. Standard weights totaling 3,327 grams, that is the weight of the container 41, the visual height stop assembly 45 and 1,000 grams of aggregate, are placed on scale platform 18. Counterweights which will precisely balance these 3,327 grams are placed on counterpoise 28 and a standard counterweight 29 is made to equal this weight.

Numerals corresponding to specific gravity for different movable balance weight positions are now placed on the indicator plates.

Applicant's container and visual height stop assembly 45 have a total weight of 2,327 grams. The total weight of these items, plus a 1000 gram sample of aggregate, plus sufficient water to make 2,600 cc. is calculated for samples of the following specific gravities:

| Specific gravity | Weight in grams |
|---|---|
| 1.00 | 4927 |
| 1.10 | 5018 |
| 1.20 | 5094 |
| 1.30 | 5158 |
| 1.40 | 5213 |
| 1.50 | 5260 |
| 1.60 | 5302 |
| 1.70 | 5339 |
| 1.80 | 5371 |
| 1.90 | 5401 |
| 2.00 | 5427 |

With standard counterweight 29 on counterpoise 28, standard weights totaling 4,927 grams, the weight of the container, etc. with an aggregate sample of specific gravity 1.00 are placed on platform 18. With movable minor balance weight 35 in its "0" position, major balance weight 34 is moved to a position at which the scale balances. A mark of 1.0 is made above this position on major indicator plate 38. The same procedure is followed to mark 1.10 through 2.00 on major indicator plate 38.

Minor indicator plate 39 in now calibrated. Standard weights totaling 5,018 grams corresponding to the weight of a container, visual height stop assembly, 1,000 grams of aggregate of a specific gravity of 1.10, and water to make 2,600 cc. are placed on platform 18. Major balance weight 34 is placed at the 1.00 position. Minor balance weight 35 is moved to the balance position. An indicator mark "0" is made on minor indicator plate 39 above this scale beam position. A scale "A" along the lower edge of plate 39 is marked off by placing numerals 1 to 9 at equal intervals between this "0" mark. Unfortunately, scale A is accurate only in the range of 1.00 to 1.10. It is not accurate in other ranges because the weights corresponding to different specific gravity values do not vary in a linear fashion. For a 0.01 specific gravity variation the weight of the container and its contents increases an average of 0.91 grams between specific gravity 1.00 and 1.10. However, the increase is only 0.26 gram per 0.01 specific gravity variations between 1.90 and 2.00. Accordingly, separate scales B to J corresponding to the ranges 1.10 to 1.90, respectively, are marked in separate lines on indicator plate 39 by use of the same procedure.

A slightly different procedure is used with scale 110 since it has been found that an acceptable accuracy can be obtained by using a single scale C with both specific gravities 1.20 and 1.30, a single scale D with specific gravities 1.40, 1.50 and 1.60, and a single scale E with specific gravities 1.70, 1.80, 1.90 and 2.00. Similar procedures can be followed to locate the appropriate point for marking each of these scales. Indicia for scale E are marked on the top of scale beam 113. These calibration tests and indicia markings are normally a part of the scale manufacturing process. Counterweight 29, which balances the container, plus a 1000 gram sample, is normally made up then and furnished with scale 10.

*Calibrations during use*

The container with a 1000 gram weight therein is placed on load-receiving platform 18 or hook 120 with the major and minor balance weights in zero position. Scale 10 should balance with counterweight 29 on platform 28. If it does not balance, an appropriate adjustment of screw 22 is made. In the case of scale 110, no fine adjustment is provided since specific gravity readings will be within the scale accuracy even if groove 139 is slightly out of position.

After this test the 1000 gram weight is removed from the container and 2600 grams of water are added, a special counterweight 30 being provided to balance 2600 grams of water. Visual height stop 43 or tape 144 is adjusted so that a clear indication will be given when the container has precisely 2600 cc. of water or water plus aggregate therein. The adjustment is made by pouring water to the appropriate level and by making the fine adjustment with a syringe. The visual height stop should be watched closely. The proper level is indicated when the water meniscus appears to jump to the visual height stop. This calibration should be frequently repeated.

The specific gravity of aggregate varies with its moisture content. ASTM standards provide for testing specific gravity in saturated surface dry condition. Under these standards before specific gravity is tested the material is soaked for 24 hours in water, then removed and its surface dried with a towel. This should be done for accurate testing. However, if specific gravity determinations of high accuracy are not required, they may be made after relatively short soaking, or without soaking and an approximate correction factor applied. The factor can be learned by comparison of readings taken under ASTM conditions and under the less rigorous conditions.

*Operative procedure*

The bottom of the bucket is checked to be sure there is no foreign matter in it. Sufficient aggregate, the specific gravity of which is to be tested, is placed in the container to bring the scale into balance with counterweight 29 on platform 28. At this time there will be precisely 1000 grams of aggregate in the container.

The major balance weight 34 or 134 is moved to the intermediate 10th position just below the balance point. The scale is then brought into balance by appropriate manipulation of the minor balance weight 35 or 135. The proper intermediate 100th is now read on the minor scale indicator corresponding to the major scale reading.

It will be apparent that an apparatus and method have been provided by which specific gravities may be easily and quickly measured, such as aggregate, as well as a simple method provided for calibrating such a scale.

It will be obvious to one skilled in the art that various changes may be made in the invention without departing from the spirit and scope thereof and, therefore, the invention is not limited by that which is illustrated in the drawings and described in the specification, but only as indicated in the accompanying claims.

What is claimed is:

1. The method of calibrating to read directly in terms of specific gravity a beam scale having major and minor movable balance weights on the scale beam comprising (a) totaling the weight of a container to be used, of a selected sample weight of material the specific gravity of which is to be determined, and of the weight of a fluent material needed to fill the container to a predetermined volume when the container contains therein materials of selected specific gravity for each of a plurality of specific gravities, (b) placing weights equal to the weights totaled for material of a first specific gravity on the scale, (c) placing indicia corresponding to the first specific gravity on the major scale at the point where the major scale weight balances the first weight total, (d) repeating steps (b) and (c) for the weight totals for each of the other specific gravities computed in step (a), (e) while the weight on the major scale is at a balancing position for a weight computed for an unknown of a first specific gravity, placing the weights on the measuring platform equal to the weight of a container having the next highest specific gravity material, and balancing the said weights by moving the movable weight on the minor scale to a point of balance.

(f) marking the said point of balance on the minor scale, (g) returning the weight on the minor scale to the zero position and balancing the said scale with the major scale balance weight, (h) placing weights of the proper total for a container having material of the next highest specific gravity on the scale balance tray and balancing the said weights with the minor scale balance weight, and marking the said minor scale balance position, (i) continuing the same procedure for each other weight corresponding to a given specific gravity, and (j) marking intermediate points on the minor scale for each given indicia point whereby the minor scale carries a plurality of rows of indicia, one row to be used with each major scale specific gravity indication.

2. The method of claim 1 in which a weight corresponding to the weight of said container plus said sample weight is totaled and an adjustment is made to said scale whereby it will balance when a weight equal to said totaled weight is placed on the scale with the said movable balance weights in the zero position.

3. The method of calibrating a weighing scale having a weight indicator means to read directly in terms of specific gravity, comprising
 (a) totaling the weight of a container to be used, of a predetermined sample weight of a first material, the specific gravity of which is known, and of the weight of a fluent material needed to fill the container to a precise volume with said predetermined sample therein,
 (b) placing weights equal to the weights totaled in step (a) on the scale,
 (c) placing indicia corresponding to the known specific gravity of said first material on the scale at the point registered by the weight indicator means following step (b), and
 (d) repeating steps (a), (b) and (c) for at least two additional materials of a different known specific gravity to provide a scale indicia range within which unknown specific gravity materials falling within said range may be determined directly on said scale.

4. Apparatus for determining specific gravity comprising
 (a) a container having means to indicate when it is filled to a designated volume, a vertically disposed rod supported by said container having its tip located intermediate the bottom and the top of the container,
 (b) a weighing scale for determining the weight of the said container when it is filled to the designated volume with a fluent material of known specific gravity and known weight of material of unknown specific gravity, and
 (c) an indicator on said scale having indicia marked thereon, whereby the scale can be read in terms of specific gravity when the said container is placed thereon.

5. Apparatus according to claim 4 in which said rod is vertically adjustable.

6. Apparatus in accordance with claim 4 in which said rod is supported by the top of the container and projects downwardly into the container.

7. Apparatus in accordance with claim 4 in which the tip of said rod is surrounded by a vertically disposed screen which projects above and below the level of the tip and in which a horizontal screen member is secured to the vertical screen member below the rod tip.

8. The method of claim 3 in which the weight of said container and said sample weight are totaled and an indicium corresponding to the total is placed at the point registered by the weight indicator means for this weight.

9. Apparatus for determining specific gravity of a sample of solid material of predetermined weight and unknown volume, comprising
 a container which includes means for indicating the presence therein of a precise volume of fluent material,
 a weighing scale having weight holding means, for holding and weighing said container,
 indicator means on the scale mounted for movement to various positions on the scale corresponding to the weight carried on the weight holding means,
 indicia on the scale, each corresponding to a specific gravity, and each located at a position indicated by said indicator means when weights are placed on said scale corresponding to the total weights of said container,
  said predetermined sample weight, and sufficient fluent material of selected specific gravity to fill said associated container to said precise volume when said predetermined weight of sample of that specific gravity is in the container.

10. Apparatus in accordance with claim 9 in which
 the said scale is a beam scale including a support, a fulcrum on the support, a beam mounted on the fulcrum and having said weight-holding means connected thereto,
 said indicator means includes weights and means mounting the weights for movement on the beam to variable positions to balance said container, and
 said indicia are marks, each corresponding to a specific gravity and each located adjacent the points on the beam at which said weights will balance said container when it has a sample of that specific gravity and of the predetermined weight therein and sufficient of said fluent material to fill the said container to the said precise volume.

11. Apparatus in accordance with claim 10 in which said indicator means includes major and minor balance weights slidably mounted on the beam,
 some of said indicia are arranged to form a major slide scale by locating the indicia adjacent spaced points on the beam at which the major balance weight balances the container when it is filled to the precise volume with a known sample weight of material of a particular specific gravity corresponding to the particular indicia mark and the said fluent material, and
 other of said indicia are arranged to form a plurality of minor scales, each of said minor scales being intended for use with samples of specific gravities intermediate particular indicia on the major scale, the indicia of each minor scale being located adjacent points on the beam where the minor balance weight balances the container when it is filled to the precise volume with a sample of that specific gravity and sufficient of said fluent material to fill the container to the precise volume when the major balance weight is located at the specific gravity major indicia next below the specific gravity of that sample.

References Cited

UNITED STATES PATENTS

| | | | |
|---|---|---|---|
| 34,943 | 4/1862 | Chinnock | 73—427 |
| 253,633 | 2/1882 | Schorse | 73—426 |
| 290,945 | 12/1883 | Upham | 177—245 |
| 1,229,641 | 6/1917 | Munzner | 73—433 |
| 1,401,763 | 12/1921 | Damon | 73—427 |

OTHER REFERENCES

Ganot: Elementary Treatise on Physics, London, Longmans, Green and Co., 1898, pp. 109–110 QC 21. G3tE. Copy in group.

Ferry, E. S.: Physics Measurements, New York, John Wiley and Sons, vol. 1, 1926, pp. 43–44. QC 39, F4.

RICHARD C. QUEISSER, *Primary Examiner.*

DOUGLASS SCHNEIDER, *Assistant Examiner.*